United States Patent [19]
Saitto et al.

[11] Patent Number: 4,586,051
[45] Date of Patent: Apr. 29, 1986

[54] REFLECTOR DISTORTION COMPENSATION SYSTEM FOR MULTIPLE-BEAM WAVE SATELLITE ANTENNAS

[75] Inventors: Antonio Saitto; Giovanni Mica, both of Oegstgeest, Netherlands

[73] Assignee: Agence Spatiale Europeenne, Paris, France

[21] Appl. No.: 470,538

[22] Filed: Feb. 28, 1983

[30] Foreign Application Priority Data

Mar. 10, 1982 [FR] France .................... 82 04043

[51] Int. Cl.4 .................................... H01Q 19/10
[52] U.S. Cl. .................................... 343/703; 343/779; 343/DIG. 2; 343/358
[58] Field of Search ............ 343/703, DIG. 2, 779, 343/762, 781 R, 761, 374, 376, 355, 357–359, 385, 757, 876, 760, 840, 894; 455/98, 115, 277

[56] References Cited

U.S. PATENT DOCUMENTS

| 3,164,835 | 1/1965 | Alsberg | 343/779 |
| 3,453,633 | 7/1969 | Phillips | 343/779 |
| 3,490,021 | 1/1970 | Hogg et al. | 343/703 |
| 3,633,208 | 1/1972 | Ajioka | 343/786 |
| 3,821,740 | 6/1974 | Ehrlich | 343/374 |
| 4,203,105 | 5/1980 | Dragone et al. | 343/781 P |
| 4,355,313 | 10/1982 | Hubert | 343/781 P |
| 4,365,252 | 12/1982 | Hubert | 343/761 |

Primary Examiner—Eli Lieberman
Assistant Examiner—Michael C. Wimer
Attorney, Agent, or Firm—Fidelman, Wolffe & Waldron

[57] ABSTRACT

The present invention is directed to a multibeam antenna reflector distortion compensation system comprising at least one remote reference radio frequency transmitter cooperating with a feed cluster of a beam forming network which includes one central and at least two peripheral feed elements, means for producing error signals including a circuit for consecutively connecting each peripheral cluster feed element to one input of an adding circuit, and the central feed element to the other input after appropriate attenuation and phase compensation of the central feed signal, and means for down-converting linear and non-linear distortion correction signals based on the down-converter output.

7 Claims, 6 Drawing Figures

REFLECTOR DISTORTION COMPENSATION SYSTEM FOR MULTIPLE-BEAM WAVE SATELLITE ANTENNAS

The present invention concerns reflector distortion compensation systems for multiple-beam wave transmission and/or reception antennas having a reflector and a beam forming network with an arrangement of feeds of the type having means for detecting the distortions of the reflector, means for producing an error signal controlled by these detection means, and means for correcting the distortions of the reflector controlled by this error signal.

It is known that the use of multiple-beam antennas with very large reflectors is conditioned by the possibility of controlling the shapes of the beams so as to limit co-channel interference, and by a degradation of performances of the system.

The structure of the reflector is subject to distortions which are generally classified in two categories, namely linear distortions and non-linear distortions, and it is known that a linear distortion of the reflector's structure causes only a displacement of the beams, with the shape of the beams remaining constant, while on the other hand a nonlinear distortion brings about a modification of that shape. It is likewise known that any linear distortion that may occur can be compensated by using the antenna's pointing mechanism, which makes it possible to rotate the reflector without modifying the system's focal distance, thus resulting in a correction of the beam displacement without affecting the shape of the beams.

On the other hand, with regard to nonlinear distortions and the variation in shape of the beams or the relative displacement between beams that may result therefrom, two methods are known which make it possible to achieve a correction. The first method is based on adaptive array antenna means and makes use of a system capable of modifying the shape or the position of the antenna, or both, in response to an error signal. The second method consists in modifying, in response to this same error signal, the amplitude and phase characteristics of the elements in the beam forming network without thereby affecting the shape and position of the reflector.

In the known systems, the error signal is produced by scanning the reflector by means of a laser to detect the possible distortions of the reflector. This, however, involves indirect means that are difficult to implement and therefore unsuitable.

This is why the invention is intended to provide the means for producing an error signal directly that can also be used with either of the two correction methods cited above (that is, both in the case where the means for correcting the distortions of the reflector include a system for modifying the shape and/or position of the reflector and in the case where these means include a system for modifying the amplitude and phase characteristics of the elements in the beam forming network).

To this end, the invention involves a compensation system of the aforementioned type, characterized by the fact that the means for detecting the distortions include at least one HF signal transmitter, stationary and remote, which cooperates with the arrangement of feeds of the beam forming network which is in the receiving mode, this arrangement including one central feed and some peripheral feeds that amount to at least two and are placed around the central feed in a symmetrical arrangement, while the means for producing an error signal have an adding circuit whose input means sequentially are connected to the two peripheral feeds in question, while its output is connected to a linear-distortion correction-signal generating circuit. The two peripheral feeds in question may preferably be connected to two switchable inputs of a switching part whose output is connected to an input of said adding circuit.

It is in fact known that in multibeam antennas which classically include a beam forming network the various elements of the feed arrangement are placed in a symmetrical arrangement, for example triangular, rectangular, etc. It is thus clear that some of these elements, and perhaps even all, can be utilized according to the invention in order to develop the desired signals. More particularly, the preceding indication whereby this arrangement of feeds functions in the receiving mode means that its elements are utilized to detect the signals sent by said transmitter.

The invention finds an especially advantageous application in multiple-beam antennas mounted on satellites, in which case the HF transmitter consists of a beacon located on the ground adjusted to point in the direction of the desired satellite.

The arrangement indicated above makes it possible, while processing these signals coming from the transmitter, to extract from these at least one linear-distortion correction signal and, with complementary adaptations, a nonlinear-distortion correction signal and a yaw correction signal.

Indeed, in the case for example of an antenna with seven feeds having a triangular symmetry, such as that illustrated in the attached FIG. 1 and which will be described in greater detail below, the various peripheral feeds in the arrangement supply secondary beams having approximately identical shapes. However, in relation to the focal axis of the antenna and to the central feed these beams show an angular displacement that is given by the relationship:

$$\delta(\phi) = \beta S/2\phi = k60° \quad k=1,2\ldots 6 \quad (1)$$

in which S is the distance between a peripheral feed and the central feed and $\beta$ is the beam deviation factor. This factor is given by:

$$\beta = \beta_o(1 - \Delta F/F)$$

in which F is the focal distance of the antenna, $\Delta F$ is the defocusing, and $\beta_o$ the beam deviation factor without defocusing.

It is known that the signal level of the six peripheral beams varies with the system's optical range, while that of the central beam is virtually insensitive to it, and that in addition the gain loss is the same for all seven beams. The signal level of each of the peripheral beams can be calculated by the relationship:

$$E_{\text{peripheral}} \simeq \sqrt{G} \exp\left(-1.388 \frac{\left(\beta_o \frac{S}{2F}\right)^2 \left(1 - \frac{\Delta F}{F}\right)^2}{\theta_3^2}\right), \quad (3)$$

or $$E_{per.} \cong \sqrt{G}\left(1 + 0.694\frac{\left(\beta_o\frac{S}{F}\right)^2}{\theta_3^2} \cdot \frac{\Delta F}{F}\right)\exp\left(-1.388\frac{\beta_o\frac{S}{2F}}{\theta_3^2}\right)^2$$

in which G is the gain of the antenna for each feed source and $\theta_3$ the beam width at 3 dB for each feed.

If we assume that $\theta_3 \cong 1.03\lambda/D$ and that $\beta_o = 0.94$, $\lambda$ being the wave length of the waves used and $D$ the diameter of the antenna, the result is that $$E_{per} \cong \sqrt{G}\exp\left(-0.29\left(\frac{SD}{F\lambda}\right)^2\right)\left(1 + 0.58\left(\frac{SD}{F\lambda}\right)^2\frac{\Delta F}{F}\right) . \tag{5}$$

If we assume that there is no defocusing, i.e., that there is no nonlinear distortion, it is possible to suitably weight the various feed signals so that they satisfy the following equation:

$\alpha.$(central feed signal)$-6\beta$(peripheral feed signal)$=0$ (6)

and the same hypothesis leads to the following simplification of equation (5):

$E_{per} \cong \sqrt{G} \exp.(-0.29(SD)^2/\lambda F)=0$ (5')

while the signal from the central feed is given by:

$E_{cent} \cong \sqrt{G}$ (3')

In this case, equation (6) becomes:

$$\alpha\sqrt{G} - 6\beta\sqrt{G}\exp\left(0.29\left(\frac{SD}{\lambda F}\right)^2\right) = 0 \tag{7}$$

and the value of the relationship $\alpha/\beta$ can be deduced:

$\alpha/\beta = 6 \exp.(-0.29(SD)^2/\lambda F)$ (8)

Since furthermore the power conservation can be expressed in the form of the relationship:

$\alpha^2 + 6\beta^2 = 1$ (9)

the values of $\alpha$ and $\beta$ can be deduced from (8) and (9).

Thus the signal supplied by the adding circuit mentioned above, which itself developed this signal from the signals coming from the two peripheral feeds in question, can be represented by a function of time f(t) representing a measurement of the existing linear distortion to be corrected.

While this linear distortion may in some cases be zero, in which case f(t)=C, C being a constant, it is generally not zero, and in this case f(t) is a trigonometric function of time, as for example:

$f(t) = A \cos(\omega t + \phi)$ with $\omega = 2\pi/T$.

T being the period of the waves used and supplied by the remote transmitter.

Especially advantageous is the fact that the circuit generating the linear distortion correction signal may include a circuit for the generation of the components of the input signal for the primary axis (or NS) and the transversal axis (or EW) of the antenna's support (axes of the satellite in the particular case in question), and the two outputs of this circuit may be connected to parts controlling the rotation of the antenna's reflector. These two components or outputs have as their values:

$\epsilon_x = A \cos \phi$ $\epsilon_y = A \sin \phi$

In this case, it can be seen that the system according to the invention is used with the first classical correction method indicated above, since it modifies the antenna's position.

It will also be noted that determination of the linear distortion correction signal which has been described above does not require the use of any reference signal, since the characteristics of the beams used are in this case constant, and only a simple displacement of these beams occurs. This situation corresponds to the fact that the relationship (b 6) indicated above is constantly satisfied.

If, on the other hand, there exists a defocusing, i.e., a nonlinear distortion, the first member of the relationship (6) is not equal to zero, and it is then possible, by using this equation, to calculate a nonlinear distortion error signal that is obtained from the relationship (6), which is in this case written:

$\alpha.$(central feed signal)$-6\beta.$(peripheral feed signal)$\neq 0$ (10)

The values of $\alpha$ and $\beta$ are then determined by considering an ideal antenna with no nonlinear distortion, so that these values are given based on the two equations (8) and (9) mentioned above. Combining these last two equations with the above relationship (10) then yields:

$\epsilon = \alpha 0.58(SD/\lambda F)^2 \Delta F/F\sqrt{G}$ (11)

this relationship proving that the error signal in question is proportional to the defocusing $\Delta F$.

This is why according to another major feature of the invention at least one of the two peripheral feeds may be connected to a first input of said adding circuit and the central feed connected to a second input of this circuit, while the output of this adding circuit is likewise connected to a circuit generating a nonlinear distortion correction signal.

One finds in fact that by combining the signal $V_1$ from the central feed and at least one signal from one of the peripheral feeds the nonlinear distortion error signal can be obtained, since this may be written:

$\epsilon = \alpha V_1 - 6\beta V_{peripheral}$ (12)

and that this relationship is equivalent to the preceding relationship (11).

Hence unlike the case studied above in which the nonlinear distortion was zero, here in order to determine the error signal it is appropriate to use a reference signal that is based on the output signal from the central feed, since this feed, as already indicated, is not sensitive to nonlinear distortions. Preferably, an attenuator circuit and a phase shift circuit can be interposed, mounted in series between the output of the central feed and the associated input of the additional circuit.

Especially advantageous is the fact that at least three of the peripheral feeds can be connected respectively to the same number of switchable inputs of a switching device, the output of which is connected to an input of the adding circuit. Indeed, any one of these peripheral feeds may develop a fault or failure, in which case, if this feed was the only peripheral feed used in the compensation system, the fault or failure could have an effect on the proper operation of the system, which is avoided because of the use of several peripheral feeds provided for here. In this case, the relationship (12) can be written as follows:

$$\epsilon = \alpha V_1 - 6\beta(V_{n+2} + V_n - V_{n+1}) \quad (12')$$

in which n, n+1 and n+2 are the serial numbers of the three feeds in question, or of three of these feeds when there are more of them, while $\alpha$ and $\beta$ are determined in the same way as above.

Of course, improper operation may also be caused by the switching device, in which the aforementioned combination of the output signals from several feeds makes it possible to detect this improper operation and remedy it. This results from the fact that, if the switching device is operating appropriately, the following equation is satisfied:

$$(F_{n-1} + F_{n+1}) - F_n = (F_{p-1} + F_{p+1}) - F_p,$$

with n and p each representing one of the serial numbers of the various feeds in the arrangement which are connected to the switching device, on condition that $n \neq 1$ and $p \neq 1$. Hence in the case of an arrangement of seven feeds considered above it is necessary for example to check the equation:

$$(F_2 + F_4) - F_3 = (F_5 + F_7) - F_6,$$

which may be obtained for example by providing in the compensation system a logic circuit which will make it possible to determine which of the switching device's switchable inputs is not operating.

It will also be noted that the case considered above, in which there is a nonlinear distortion to be corrected, occurs mostly when it is desired to make a beam pointing correction and a correction of the first side lobe. The beam's pointing error is in particular caused by a rotation of the reflector or by its translation perpendicular to the equivalent focal line of the feed arrangement of primary sources, while a deterioration of the side lobes is due to reflector translation along this same focal line or to an opening or closing of the reflector's folding structure.

Especially advantageous is the fact, already known, that the error signals dealt with up to this point, i.e., the linear distortion correction signal and the nonlinear distortion correction signal, may, in the case of utilization of the compensation system according to the invention as part of the first method of correction referred to earlier, be applied to a control mechanism for the reflector having three degrees of freedom, which allows this reflector to be adjusted both in rotation and in axial translation.

The same compensation system according to the invention can also make it possible to detect a yaw error in the antenna's support, for example in the satellite. It is known that a yawing rotation in this support is split into a rotation around the yaw axis and a movement of translation along the axes N-S and E-W of the multibeam system. Hence, the system may advantageously be provided with two HF signal transmitters both located remotely from the antenna but close to one another, plus a second arrangement of feeds associated with the same antenna receiver, the two arrangements being connected to the means for producing an error signal with a circuit generating the yaw correction signal. Preferably as well, this generator circuit can be connected to the reflector's attitude adjustment mechanism, already indicated above.

In the case of the central beam associated with the central feed of one of the arrangements in question, the beam has angles $\mu_o$ and $\phi_o$ in relation to the center of the Earth P, as shown in FIG. 6 attached. In the case of another beam, this beam is arranged according to the parameters $\mu_n$ and $\phi_n$ in relation to the central beam in question. The yawing rotation corresponds more particularly, as already indicated above, to a rotation around the central beam (to the extent that it coincides with the yaw axis) and a movement of translation whose components along the axes E-W and N-S have the values of $2 \sin \epsilon/2 \, \mu_o \cdot \sin(\phi_o + \epsilon/2)$ and $2 \sin \epsilon/2 \, \mu_o \cdot \cos(\phi_o + \epsilon/2)$ respectively. An analogous detection is simultaneously made with the second transmitter and the second arrangement of feeds, and the circuit generating the yaw correction signal mentioned above includes a comparator whose inputs are provided with signals corresponding to the two beam displacements detected as indicated above. The residual error obtained is $2 \sin \epsilon/2 \, \mu_n$, and this is proportional to the yaw error in question to the extent that $\sin \epsilon/2$ is well below 1, which justifies the direct action of the resulting signal on the reflector's attitude control device. It will in particular be noted that in this case the system makes it possible, for a beam width at 3 dB having a value of 0.2° to 0.3°, to obtain a yaw error sensitivity greater than 0.25°.

The preceding presentation of the invention makes it obvious that although a system operating in HF is used the reflector corrections are largely independent of frequency. In addition, the principal arrangement of feeds used is already a basic constituent element of the antenna, which is made necessary for its multibeam use. Hence, the complexity and weight of the beam forming network are not increased, and neither is there any modification in the electrical performance of the antenna (more particularly with regard to matching, losses, and transmission delay). Finally, in the case of antennas mounted on large satellites, the basic reflector of such an antenna already ordinarily has opening or deployment mechanisms (unfurlable reflector) that can be modified quite simply in order to allow the corrections in question to be made.

Furthermore, it is possible to implement the invention by using arrangements of feeds in which the number of feeds is not seven but which are on the other hand arranged symmetrically, and in this case the values used will be $m = k360/n$ with $k = 1, 2, \ldots n$, n being the order of the symmetry in question.

Other characteristics and advantages of the invention will appear from the description which follows, given by way of nonlimiting example and with reference to the attached drawings, in which:

FIG. 3 illustrates the attitude control mechanism of the antenna in FIG. 1, which is associated with the corresponding compensation system;

Figure 1:
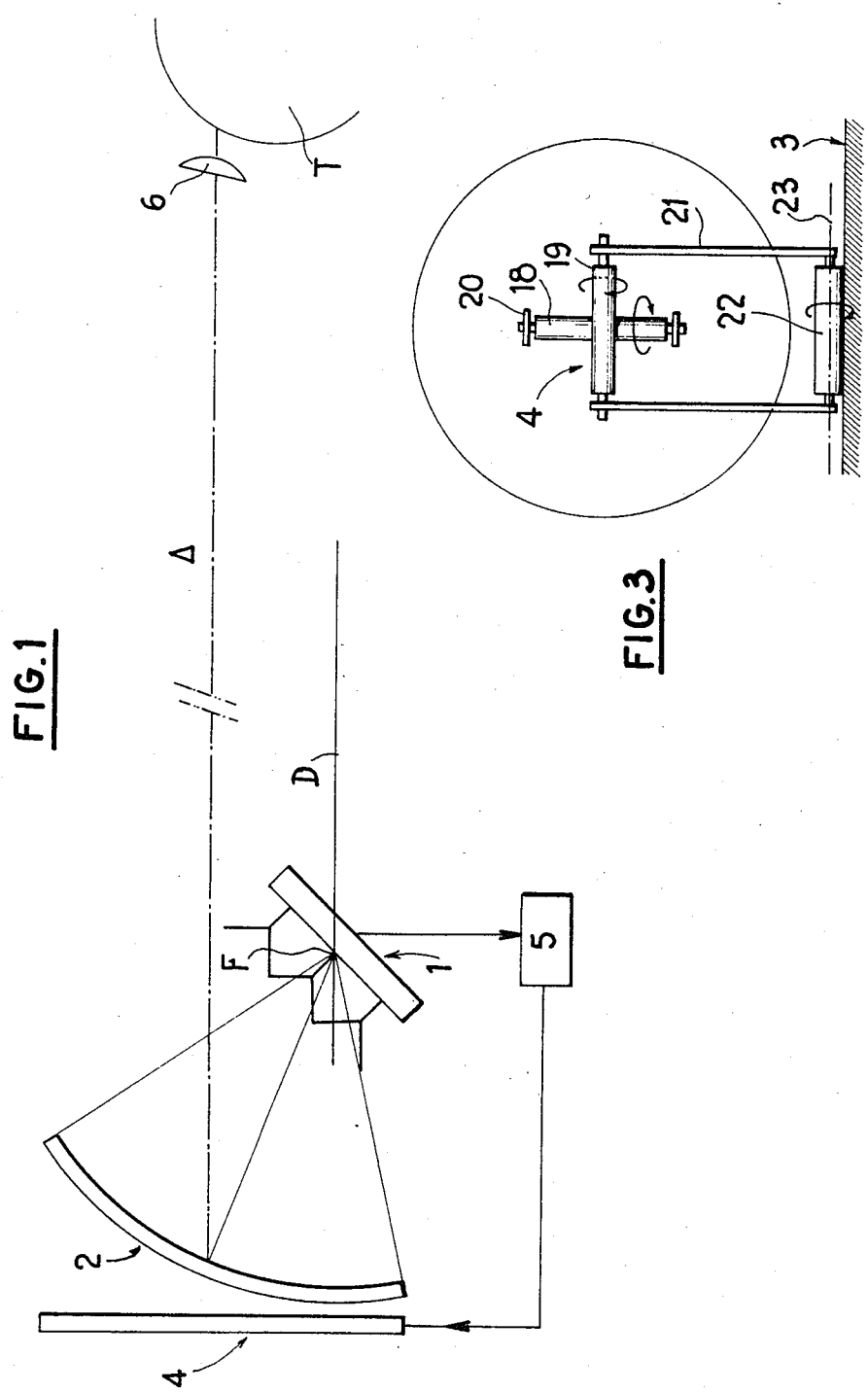
FIG. 1 shows a diagrammatic view of a compensation system according to the invention and associated with a satellite antenna.
Figure 2:
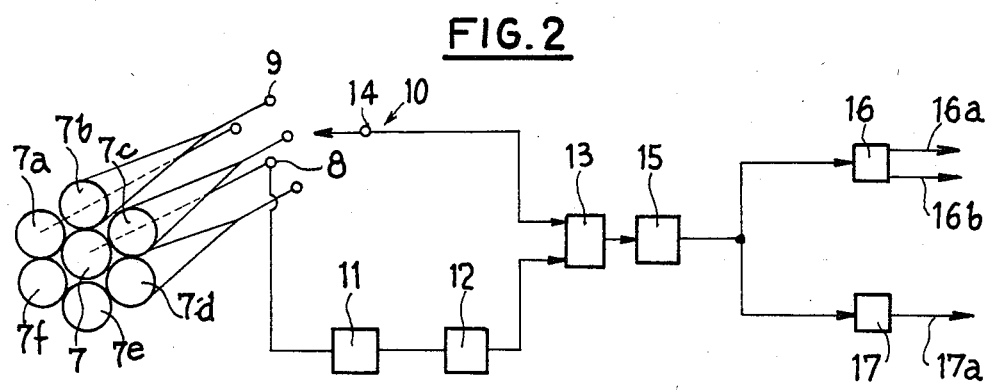
FIG. 2 shows diagrammatically the electric circuit of the system in FIG. 1.

The compensation system shown in FIGS. 1 to 3 is intended for use with a satellite antenna consisting of an arrangement of feeds 1 and a parabolic reflector 2. The effective surface of this reflector, corresponding to the aperture of the antenna, is laterally shifted in relation to the focal axis D of the dish, while the arrangement of feeds 1 is placed with its center located at the focus F of the same dish. This antenna is mounted, as shown more particularly in FIG. 3, on the platform 3 of a satellite, by means of an attitude control mechanism 4. The compensation system in question includes, in addition to the antenna described above, an electric circuit 5 which is interposed between the arrangement of feeds 1 and the attitude control mechanism 4, as well as an HF (high-frequency) transmitter 6 that consists of a beacon mounted stationary on the Earth T with its transmission axis Δ pointed at the reflector 2 of the satellite, so that the axis Δ of the beam incident on this reflector is parallel to the focal axis D of the latter. The reflector sends back this parallel incident beam in the form of a convergent reflected beam which concentrates around the focus F, hence on the arrangement of feeds 1.

As is shown more particularly by FIG. 2, the feed group 1 includes a central feed 7 and six peripheral feeds 7a to 7f arranged according to a triangular symmetry around the central feed, i.e., following the corner points of a hexagon centered on it. The output of the central feed 7 is connected to a fixed terminal 8, while the outputs of the six peripheral feeds are connected to the six switchable input terminals 9 of a switch 10. The fixed terminal 8 is connected through an attenuator 11 and a phase-shift device 12 to a first input of an adding circuit 13, while the single output terminal 14 of the switch 10 is itself directly connected to a second input of this adding circuit 13. The output of this latter circuit is connected to a down converter 15, which is itself connected to a circuit generating components of a linear distortion correction signal 16 having two component outputs 16a and 16b as well as to another circuit generating a nonlinear distortion correction signal 17 having an output 17a.

As is shown in FIG. 3, the attitude control mechanism 4 is a mechanism with threee degrees of freedom having two rotation control devices 18 and 19 around the two transversal axes of the reflector 2, these two devices being interposed between bearings 20 integral with the reflector and two support arms 21 as well as a device 22 controlling the movement of translation of the reflector, consisting of a rotating part around an axis 23 integral with the platform 3 and itself parallel to one 19 of the first two control devices so as to form an articulated rectangular assembly with this other part 19 and the two support arms 21. The three rotation control devices 18, 19 and 22 mentioned above normally consist of the parts ordinarily provided in the automatic pointing mechanism APM of the antennas onboard large satellites.

Figure 4:
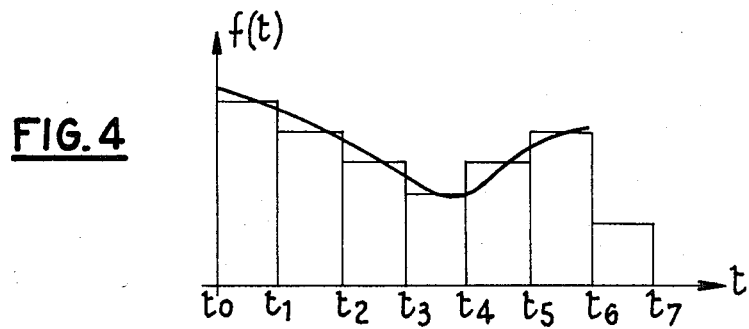
FIG. 4 shows the variation in time of the output signal supplied by the electric circuit in FIG. 2.

The operation of the compensation system has been adequately detailed in the foregoing so that it need not be fully repeated here. It will nonetheless be noted that the signal transmitted by the beacon 6 is reflected towards the group of seven feeds in the arrangement 1, the central feed 7 transmitting a reference signal to the terminal 8, while the six peripheral feeds transmit signals that are transmitted successively through the switch 10 to the other input of the adding circuit 13. As is shown more precisely in FIG. 4:

at the moment $t=t_0$, the switch connects the feed 7a to circuit 13, at the moment $t=t_1$, it connects feed 7b to it, and so on for $t=t_2$, $t_3$, and $t_4$ at the moment $t=t_5$, it connects feed 7f to it, and, at the moment $t=t_6$, only central feed 7 is connected to circuit 13.

Following this first switching cycle, a new, identical cycle is begun as of the moment $t=t_7$, when the switch again connects the first peripheral feed 7a to the circuit 13. The diagram shown in FIG. 4 makes it possible to note that, in the case of the presence of a linear distortion in the reflector 2, the output signal supplied by the adding circuit 13 over the interval $t_0$—$t_6$ is a trigonometric function $f(t)=A \cos (\Omega t+\phi)$. The time interval $t_6$–$t_7$ is reserved for the output of the central feed only for serving as a reference signal in case of non-linear, i.e., reflector shape, distortion. No reference signal is required for the determination of the linear distortion, since the reflected beam characteristics are constant and only a beam displacement took place. This means that the relation (6) is always satisfied. In the case of non-linear distortion, this is no longer true, and relation (10) applies. It will therefore be necessary to combine several feed signals with a reference signal in order to determine the error signal. The signal between $t_6$ and $t_7$, i.e. the output of the central feed, after being appropriately attenuated and phase compensated, is used as a reference signal since the central feed is insensitive to non-linear distortions. The non-linear distortion error can be determined by combining the output signals coming from at least one peripheral feed and the reference signal.

As indicated above, the electric circuit described above supplies the output circuit 16 with a linear distortion error signal, the two components of which (outputs 16a and 16b) are sent to the drives of the rotation control devices 18, 19 and 22 of the attitude control mechanism 4. Likewise, the circuit in question supplies the output circuit 17 with a nonlinear distortion error signal that is also sent to the same mechanism 4.

Figure 5:
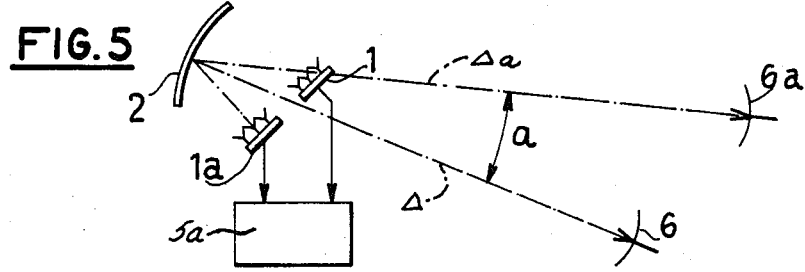
FIG. 5 shows diagrammatically another mode of realization of the invention making it possible to obtain a yaw-correction signal.

FIG. 5 illustrates the adaptation of the same compensation system for obtaining a yaw-error signal. To this end, the first arrangement of feeds 1, which cooperates with the beacon 6, is complemented by a second arrangement of feeds 1a analogous to the first which is placed on the platform next to the first arrangement and which cooperates with a second, analogous beacon 6a mounted on the ground near the first. The two incident beams Δ and Δa transmitted by the two beacons in the direction of the common reflector 2 are reflected respectively towards the two arrangements 1 and 1a, and these two incident beams are themselves separated by an angular distance a. The two arrangements 1 and 1a are furthermore connected through an electric circuit 5a of the same type as the preceding circuit 5 to the attitude control mechanism. The operation of this system in detecting yaw error has already been described in detail.

Figure 6:
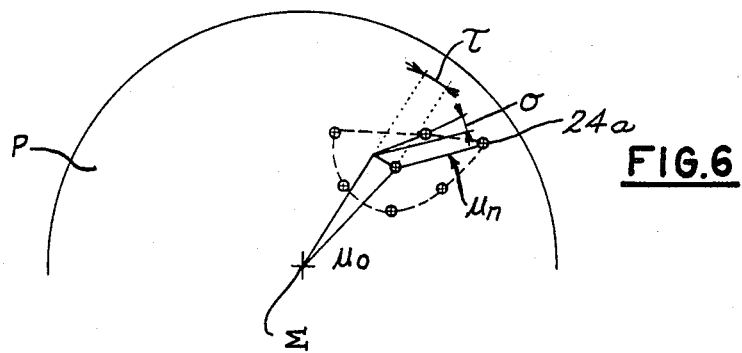
FIG. 6 shows diagrammatically the beam displacement corresponding to a yaw error.

FIG. 6 merely illustrates the reasoning given above regarding the correction of yaw errors, this figure showing more precisely the position of a central beam 24 in relation to the center E of the earth (angles $\mu_o$ and $\phi_o$) as well as the position of other peripheral beams 24a arranged according to the angles $\mu_n$ and $\phi_n$. Azimuth and elevation angles, respectively, are represented by $\mu$ and $\phi$ so that elevations $\phi_o$ and $\phi_n$ for beams 24 and 24a do not appear in FIG. 6 since an observer of FIG. 6 looks along the seven beams which are perpendicular to the paper. This figure also illustrates the value $\zeta$ of the movement of translation to be corrected and the value $\sigma$ of the residual yaw error that may be found by using the HF detector.

We claim:

1. A reflector distortion compensation system for multibeam antennas, and comprising:

a reflector and at least one beam forming network having a symmetrical arrangement of peripheral feeds around a central feed;

means for detecting distortions in said reflector, said detecting means comprising a remote transmitter providing a transmit signal to said feeds via said reflector and such that rays of said transmit signal are substantially parallel with each other when arriving at said reflector, a circuit having one input connected to said central feed and another input selectively switchable between at least two of said peripheral feeds in order to obtain linear and non-linear error signals from said circuit in response to corresponding linear and non-linear distortions;

means for generating linear and non-linear distortion correction signals in response to said error signals; and means for correcting said linear and non-linear distortions of said reflector by correcting an attitude of said reflector and characteristics of said beam forming network as required.

2. A system, as in claim 1, wherein said distortion compensating means further comprises:

means for adjusting characteristics of elements of said beam forming network in order to effect correcting of non-linear distortions, such that reflector attitude adjustment is avoidable for non-linear distortions.

3. An antenna reflector distortion compensation system as in claim 1, and further comprising:

means for generating components of said linear distortion correction signal and supplying said signal components to rotation control devices for adjusting said reflector about corresponding principal and transverse support axes.

4. An antenna reflector distortion compensation system as in claim 1, and further comprising:

means for attenuating and phase shifting a signal supplied to said one input from said central feed.

5. An antenna reflector distortion compensation system as in claim 1, said beam forming network including:

said central feed and six of said peripheral feeds.

6. A reflector distortion compensation system as in claim 1, and further comprising:

means for sequentially connecting said peripheral feeds to said other input in order to obtain an error signal from said circuit corresponding to a measure of said linear distortion and to compensate therefore by adjusting said reflector attitude in response thereto.

7. A reflector distortion compensation system as in claim 6, said circuit comprising:

means for adding a signal from each said peripheral feed to a signal from said central feed in order to obtain a non-linear distortion error signal; and means for adjusting said reflector attitude in response to said non-linear distortion error signal in order to compensate for said non-linear distortion.

* * * * *